(12) United States Patent
Hecht

(10) Patent No.: US 7,011,477 B2
(45) Date of Patent: Mar. 14, 2006

(54) ADJUSTABLE DEBURRING TOOL

(75) Inventor: Gil Hecht, Nahariya (IL)

(73) Assignee: Iscar Ltd., Tefen (IL)

( * ) Notice: Subject to any disclaimer, the term of this patent is extended or adjusted under 35 U.S.C. 154(b) by 0 days.

(21) Appl. No.: 10/932,036

(22) Filed: Sep. 2, 2004

(65) Prior Publication Data

US 2005/0084346 A1 Apr. 21, 2005

(30) Foreign Application Priority Data

Oct. 20, 2003 (IL) .................................... 158498

(51) Int. Cl.
   *B23B 29/034* (2006.01)
   *B23B 29/03* (2006.01)
   *B23B 29/08* (2006.01)
(52) U.S. Cl. ........................ 408/181; 408/195; 408/153
(58) Field of Classification Search ................ 408/181, 408/182, 183, 153, 195; 407/37
See application file for complete search history.

(56) References Cited

U.S. PATENT DOCUMENTS

| | | | |
|---|---|---|---|
| 22,474 A * | 12/1858 | Stone ........................ 408/147 |
| 2,979,974 A * | 4/1961 | Craig ........................ 408/183 |
| 3,455,188 A | 7/1969 | Pratt et al. |
| 3,486,401 A * | 12/1969 | Kelm ........................ 408/181 |
| 3,617,144 A | 11/1971 | Koppelmann et al. |
| 3,704,958 A * | 12/1972 | Gulibon et al. ............. 408/153 |
| 4,043,697 A * | 8/1977 | Eckle ........................ 408/182 |
| 4,637,285 A * | 1/1987 | Mizoguchi ................... 82/124 |
| 4,676,127 A * | 6/1987 | Watanabe .................... 82/1.2 |
| 4,710,073 A | 12/1987 | Peterson |
| 5,755,538 A | 5/1998 | Heule |
| 5,961,259 A * | 10/1999 | Ziegler ....................... 408/181 |

FOREIGN PATENT DOCUMENTS

| | | |
|---|---|---|
| DE | 3811775 | 4/1988 |
| JP | 06270001 A * | 9/1994 |

* cited by examiner

*Primary Examiner*—Boyer D. Ashley
*Assistant Examiner*—Ali Abdelwahed
(74) *Attorney, Agent, or Firm*—Womble Carlyle

(57) ABSTRACT

An adjustable deburring tool has a cutting head and a shank. The cutting head has a projecting ridge with a recessed portion. The shank has a groove that communicates with an open ended and open sided threaded bore. The ridge is slidably located in the groove with an adjusting screw screw-threaded in the threaded adjusting bore and partially located in the recessed portion of the ridge so that rotation of the adjusting screw causes lateral movement of the cutting head thereby adjusting the cutting diameter of the deburring tool.

12 Claims, 3 Drawing Sheets

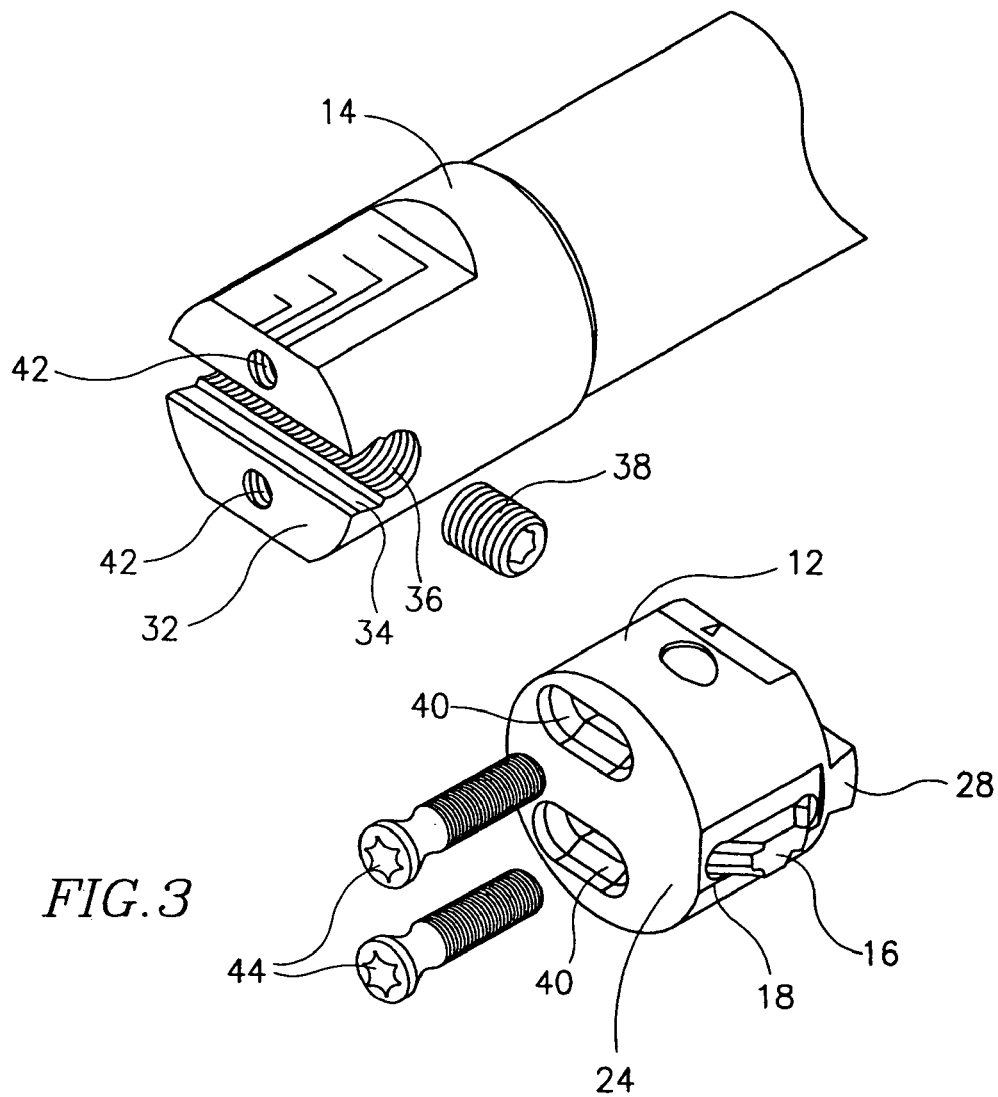
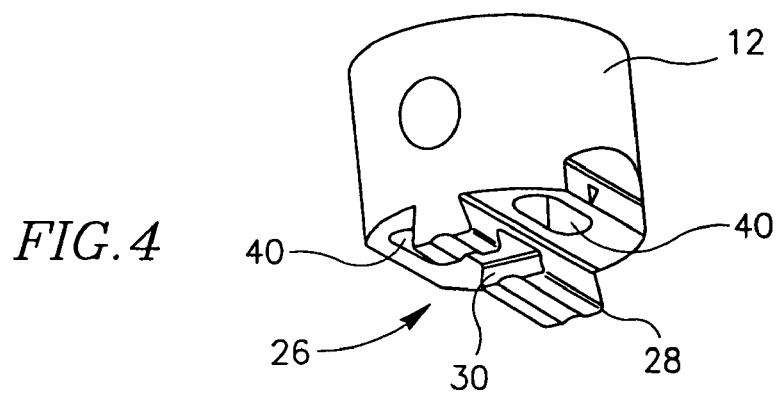

ADJUSTABLE DEBURRING TOOL

FIELD AND BACKGROUND OF THE INVENTION

The present invention relates to an adjustable deburring tool capable of deburring of bores of differing bore diameters. Deburring tools are generally designed to deburr a bore of a given bore diameter. In order to deburr bores of differing bore diameters, deburring tools with appropriate diameters are required. Inevitably, each deburring tool requires a cutting blade, or cutting insert, designed to match the diameter of the deburring tool. Therefore, the capability of deburring bores of different bore diameters requires a stock of deburring tools and a stock of appropriates cutting blades, or inserts.

SUMMARY OF THE INVENTION

In accordance with one aspect of the present invention, there is provided an adjustable deburring tool having a longitudinal axis of rotation and comprising a cutting head adjustably coupled to a shank, the cutting head having an insert pocket in which a cutting insert is retained;

the cutting head having a front face and a rear face with a ridge projecting from the rear face, the ridge having a recessed portion;

the shank having a groove communicating with an open ended and open sided threaded adjusting bore, the ridge being slidably located in the groove with an adjusting screw screw-threaded in the threaded adjusting bore and partially located in the recessed portion of the ridge.

Preferably, the ridge has a dove-tail shape and the groove has a complementary dove-tailed shape.

In accordance with the present invention, the groove and the threaded adjusting bore extend laterally to the longitudinal axis of rotation.

Preferably, the cutting head is provided with two axially extending oval shaped through bores and the shank is provided with two corresponding axially extending threaded securing bores that open out to a front face of the shank.

Further preferably, the cutting head is secured to the shank by means of two securing screws that are located in the through bores and screw threaded in the threaded securing bores.

Additionally, the shank may be provided with a scale to indicate the relative displacement of the cutting head.

In another aspect, the present invention is directed to an adjustable deburring tool holder having a longitudinal axis of rotation and comprising: a cutting head comprising an insert pocket, a front face and a rear face with a ridge projecting from the rear face, the ridge having a recessed portion, a shank comprising a groove communicating with a threaded adjusting bore; and an adjusting screw. The cutting head is adjustably coupled to the shank with the ridge being slidably located in the groove, and the adjusting screw is screw-threaded in the threaded adjusting bore and partially located in the recessed portion of the ridge.

BRIEF DESCRIPTION OF THE DRAWINGS

For a better understanding, the invention will now be described, by way of example only, with reference to the accompanying drawings in which:

FIG. 3 is an exploded perspective view of the deburring tool shown in FIG. 1;

FIG. 4 is bottom perspective view of the cutting head of the deburring tool shown in FIG. 1.

DETAILED DESCRIPTION OF THE INVENTION

Figure 1:
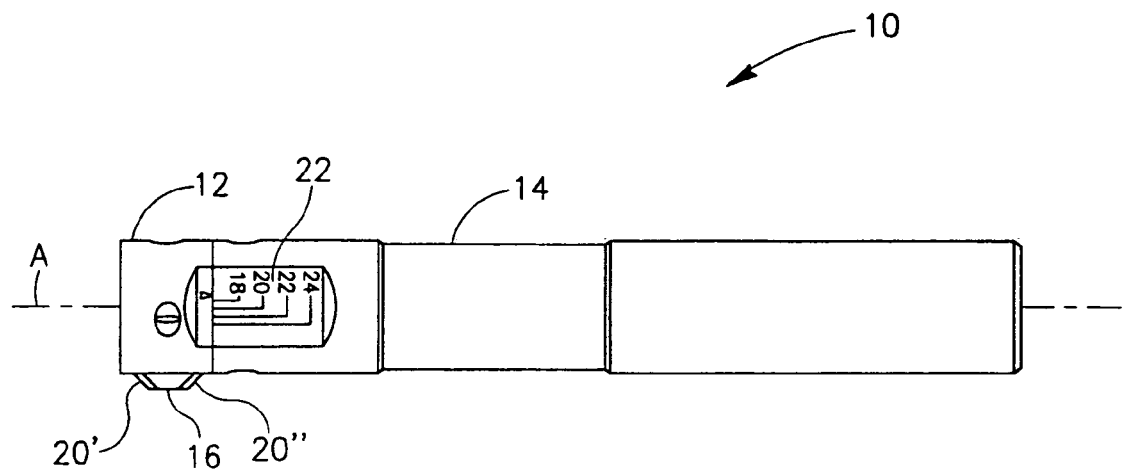
FIG. 1 is a side view of a deburring tool in accordance with the present invention.
Figure 2:
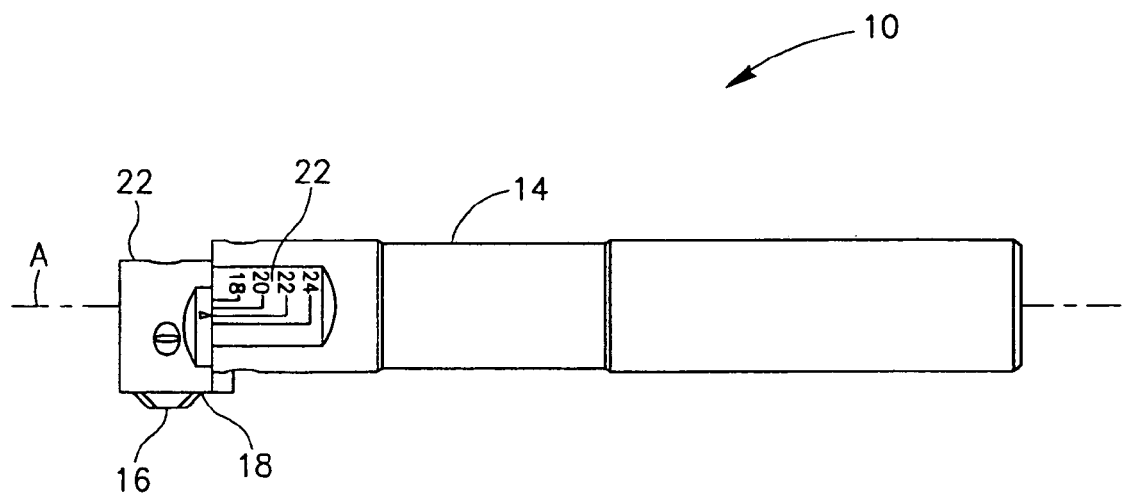
FIG. 2 is a side view of the deburring tool shown in FIG. 1 with the cutting head in an adjusted position.

Attention is first drawn to FIGS. 1 and 2, showing a deburring tool 10 in accordance with the present invention. The deburring tool 10 has a longitudinal axis of rotation A, defining a forward to rear direction, and comprises a generally cylindrical cutting head 12 adjustably coupled to a generally cylindrical shank 14. The cutting head has a cutting insert 16 fixed or slidably retained in an insert pocket 18. Two cutting edges 20 (20', 20") are shown in the figures. A forward facing cutting edge 20' for deburring the front edge of a bore and a rearward facing cutting edge 20" for deburring the rear edge of a through bore. In FIG. 1, the cutting head 12 is shown in a non-adjusted position. In the non-adjusted position, the deburring tool 10 is capable of deburring a bore with a given minimum diameter determined by the distance of the cutting edges 20 from the longitudinal axis of rotation A. In FIG. 2, the cutting head 12 is shown in an adjusted position. In the adjusted position, the deburring tool 10 is capable of deburring a bore with a diameter larger than the given minimum diameter due to the fact that the cutting head 12 is laterally displaced relative to the non-adjusted position shown in FIG. 1, so that the cutting edges 20 are at a greater distance from the longitudinal axis of rotation A in FIG. 2. For the convenience of an operator using the deburring tool 10, a scale 22 giving the relative displacement of the cutting head 12 relative to the non-adjusted position is provided. The scale comprises a plurality of linearly arranged marks bearing numeric indicia provided on the shank, and the cutting head moves laterally along these marks when the adjusting screw is rotated, the marks indicating a numeric extent of the displacement of the cutting head.

Figure 5:
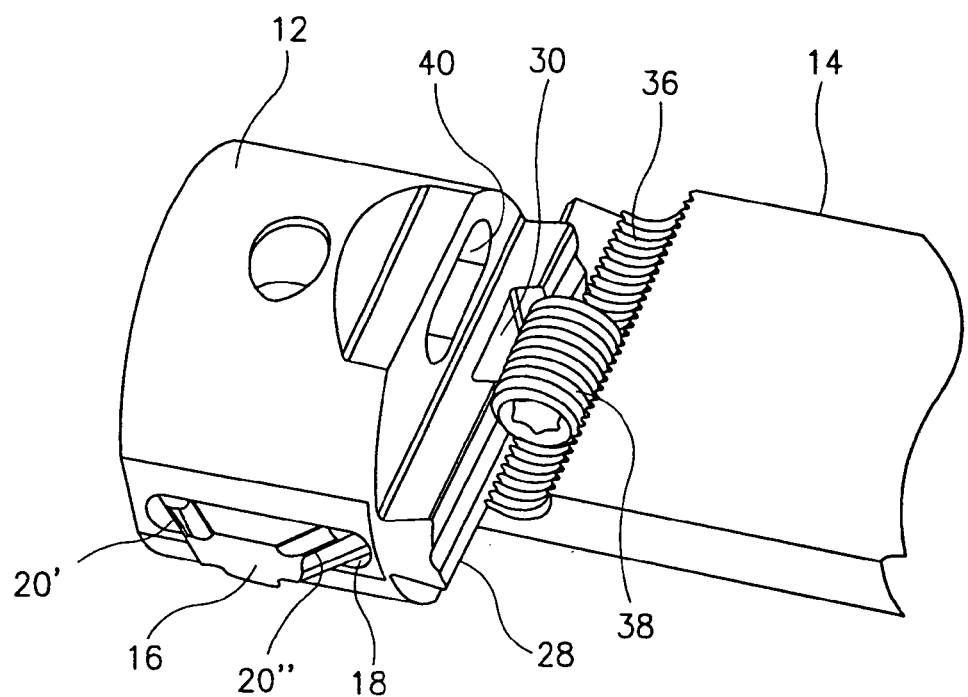
FIG. 5 is a partially cut away top rear perspective view of the deburring tool shown in FIG. 1.

Attention is now turned to FIGS. 3 to 5. The cutting head 12 has a front face 24 and a rear face 26 with a laterally extending ridge 28 projecting from the rear face 26. The ridge 28 has a recessed portion 30. The ridge 28 has a dove-tail shape, that is, it diverges outwardly and rearwardly. The shank 14 has at its front face 32 a laterally extending groove 34 which has a complementary dove-tailed shape to that of the ridge 28 which enables the ridge 28 to be inserted into it in a direction perpendicular to the longitudinal axis of rotation A. The cutting head 12 can move laterally, perpendicular to the longitudinal axis of rotation A, with the ridge 28 sliding in the groove 34. The dove-tail connection between the ridge 28 and the groove 34 ensures a certain degree of stability, so that while the ridge 28 is sliding in the groove 34 it will not fall out of the groove 34 from the front face 32 of the shank 14.

The groove 34 communicates with a laterally extending open ended and open sided threaded adjusting bore 36. Lateral adjustment of the cutting head 12 relative to the shank 14 is performed by means of an adjusting screw 38. The cutting head 12 is adjustably connected to the shank 14 with the ridge 28 located in the groove 34, the adjusting screw 38 located partially in the recessed portion 30 of the ridge 28 and screw-threaded in the threaded adjusting bore 36. When the adjusting screw 38 is rotated it moves laterally in the threaded adjusting bore 36 and at the same time urges the cutting head 12 laterally since it is located partially in the recessed portion 30 of the ridge 28.

The cutting head is provided with two axially extending oval shaped through bores 40 and the shank 14 is provided with two corresponding axially extending threaded securing bores 42 that open out to the front face 32 of the shank 14. The cutting head 12 is secured to the shank 14 by means of two securing screws 44 that are located in the through bores 40 and screw threaded in the threaded securing bores 42. When adjusting the lateral position of the cutting head 12, it is sufficient to loosen the securing screws 44, they do not have to be completely removed since the oval shape of the through bores 40 is sufficient to ensure free lateral movement of the cutting head 12.

It will be appreciated that the adjustable deburring tool holder comprising the cutting head 12, the shank 14 and the adjusting screw 38 can be used with the same cutting insert 16 to provide a range of deburring diameters. This is because the mechanism described hereinabove for lateral adjustment of the cutting head 12 enables the lateral location of the cutting edges 20 to be adjusted over a continuous range of values, thereby enabling the deburring tool 10 to deburr bores over a continuous range of diameters.

Although the present invention has been described to a certain degree of particularity, it should be understood that various alterations and modifications could be made without departing from the scope of the invention as hereinafter claimed.

The invention claimed is:

1. An adjustable deburring tool having a longitudinal axis of rotation and comprising a cutting head adjustably coupled to a shank, the cutting head having an insert pocket in which a cutting insert is retained;
  the cutting head having a front face and a rear face with a ridge projecting from the rear face, the ridge having a recessed portion;
  the shank having a groove communicating with an open ended and open sided threaded adjusting bore, the ridge being slidably located in the groove with an adjusting screw screw-threaded in the threaded adjusting bore and partially located in the recessed portion of the ridge;
  wherein the cutting head is provided with two axially extending oval shaped through bores and the shank is provided with two corresponding axially extending threaded securing bores that open out to a front face of the shank; and
  wherein the cutting head is secured to the shank by means of two securing screws that are located in the through bores and screw threaded in the threaded securing bores.

2. The adjustable deburring tool of claim 1, wherein the ridge has a dove-tail shape and the groove has a complementary dove-tailed shape.

3. The adjustable deburring tool of claim 1, wherein the groove and the threaded adjusting bore extend laterally to the longitudinal axis of rotation.

4. The adjustable deburring tool of claim 1, wherein the shank is provided with a scale to indicate relative displacement of the cutting head.

5. The adjustable deburring tool of claim 1, wherein:
  the ridge has a dove-tail shape and the groove has a complementary dove-tailed shape;
  the groove and the threaded adjusting bore extend laterally to the longitudinal axis of rotation;
  the shank is provided with a scale to indicate relative displacement of the cutting head.

6. An adjustable deburring tool holder having a longitudinal axis of rotation and comprising:
  a cutting head comprising an insert pocket, a front face and a rear face with a ridge projecting from the rear face, the ridge having a recessed portion;
  a shank comprising a groove communicating with a threaded adjusting bore; and
  an adjusting screw;
  wherein:
  the cutting head is adjustably coupled to the shank with the ridge being slidably located in the groove;
  the adjusting screw is screw-threaded in the threaded adjusting bore and partially located in the recessed portion of the ridge;
  the cutting head is provided with two axially extending oval shaped through bores and the shank is provided with two corresponding axially extending threaded securing bores that open out to a front face of the shank; and
  the cutting head is secured to the shank by means of two securing screws that are located in the through bores and screw threaded in the threaded securing bores.

7. The adjustable deburring tool holder of claim 6, wherein the ridge has a dove-tail shape and the groove has a complementary dove-tailed shape.

8. The adjustable deburring tool holder of claim 6, wherein the groove and the threaded adjusting bore extend laterally to the longitudinal axis of rotation.

9. The adjustable deburring tool holder of claim 6, wherein the shank is provided with a scale to indicate relative displacement of the cutting head.

10. The adjustable deburring tool holder of claim 6, wherein the threaded adjusting bore is open ended and open sided.

11. The adjustable deburring tool holder of claim 6, further comprising a cutting insert retained in the insert pocket.

12. The adjustable deburring tool holder of claim 6, wherein:
  the ridge has a dove-tail shape and the groove has a complementary dove-tailed shape;
  the groove and the threaded adjusting bore extend laterally to the longitudinal axis of rotation;
  the shank is provided with a scale to indicate relative displacement of the cutting head;
  the threaded adjusting bore is open ended and open sided; and
  a cutting insert is retained in the insert pocket.

* * * * *